United States Patent [19]

Stanzel

[11] 3,919,805

[45] Nov. 18, 1975

[54] MODEL AIRCRAFT

[76] Inventor: Victor Stanzel, Schulenburg, Tex. 78956

[22] Filed: Nov. 16, 1973

[21] Appl. No.: 416,593

[52] U.S. Cl. ..................... 46/243 AV; 46/77; 46/78
[51] Int. Cl.² ........................................ A63H 33/26
[58] Field of Search .............. 46/74, 76, 77, 78, 79, 46/80, 81, 243 AV, 247, 17

[56] References Cited

UNITED STATES PATENTS

| | | | |
|---|---|---|---|
| 1,315,479 | 9/1919 | Douglass | 46/76 R |
| 1,507,710 | 9/1924 | Pohlman | 46/76 R |
| 2,416,805 | 3/1947 | Walker | 46/77 |
| 2,947,108 | 8/1960 | Dodd, Jr. et al. | 46/77 |
| 3,018,585 | 1/1962 | Stanzel | 46/243 AV |
| 3,731,424 | 5/1973 | Meyer | 46/243 AV |

FOREIGN PATENTS OR APPLICATIONS 239,399  9/1925  United Kingdom ................ 46/76 R

*Primary Examiner*—Robert Peshock
*Assistant Examiner*—J. Q. Lever
*Attorney, Agent, or Firm*—Vinson, Elkins, Searls, Connally & Smith

[57] ABSTRACT

A remotely powered and controlled aircraft is provided of the type wherein the propeller is driven from a remote drive unit by an elongated flexible cable confined within a flexible tube. The aircraft of the invention includes a secondary control knob slidably and rotatably mounted about the flexible tube for selectively controlling the effective length of the tube and cable to thereby control the radius of flight of the aircraft. In a preferred embodiment, the aircraft is a biplane with a unique wing support construction, including eyelets in the wings and flexible struts having wing engaging hooks thereon which may be selectively inserted through the eyelets for engagement with the wings. This abstract is not to be construed in any way to define or limit the invention set forth below.

5 Claims, 5 Drawing Figures

MODEL AIRCRAFT

BACKGROUND OF THE INVENTION

1. Field of the Invention

This invention relates to toy or model aircraft of the type which are remotely powered and remotely controlled in flight and more particularly to improvements in the control mechanism and in the construction of such aircraft.

2. Description of the Prior Art

U.S. Pat. No. 3,018,585 discloses prior art remotely powered and controlled model aircraft somewhat similar to those of the present invention, but not possessing the improvements of the present invention.

SUMMARY OF THE INVENTION

The invention relates to improvements in the remotely powered and controlled model aircraft of the general type disclosed in U.S. Pat. No. 3,018,585, wherein the aircraft is propelled by a propeller driven from a remotely located motor through an elongated flexible drive shaft or cable confined within an elongated flexible tube or housing. According to one aspect of the present invention means are provided to foreshorten the effective length of the cable and tube to thereby control the radius of flight of the aircraft and to assist in performing stunts, etc. Preferably the foreshortening means comprise a secondary control knob having a central bore therethrough which knob is slidably and rotatably positioned about the tube and which may be held in the hand of the aircraft without interfering with the operation or rotation of the drive cable or surrounding tube.

According to another aspect of the invention, the aircraft is of biplane construction and unique support construction for the wings is provided including eyelets or openings in the wings and flexible support struts with wing engaging means thereon adapted for insertion through the eyelets to engage and support the wings at the margins of the eyelets.

DESCRIPTION OF THE DRAWINGS

In the accompanying drawings, which form a part of the application and in which like numerals indicate like parts.

DESCRIPTION OF THE PREFERRED EMBODIMENT

Figure 1:
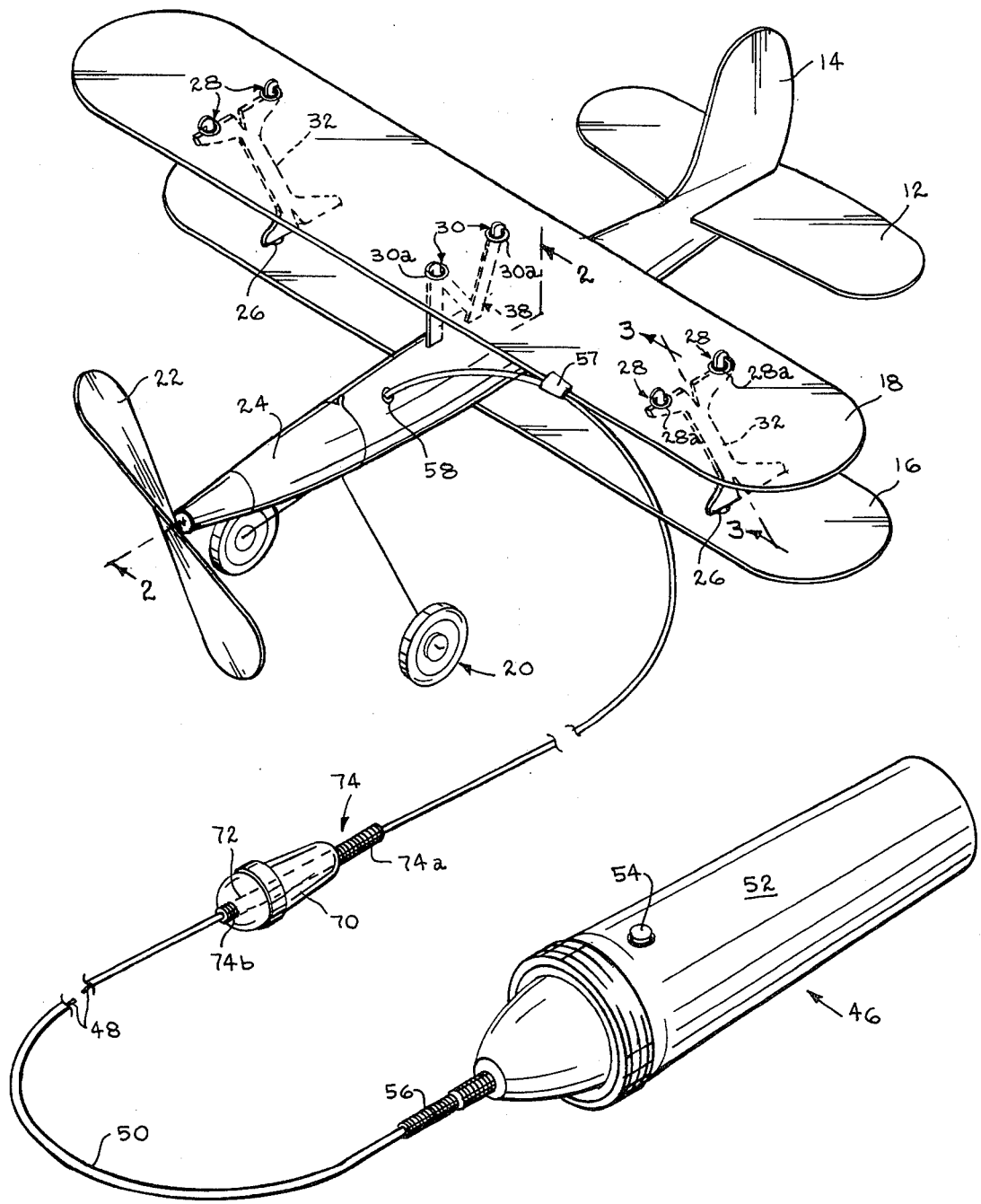
FIG. 1 is a perspective view illustrating a preferred embodiment of the aircraft of the present invention, including the remote drive unit, drive cable and tube.

Referring now to FIG. 1, there is shown a model aircraft of biplane construction having a hollow body or fuselage 10, a tail assembly including stabilizers 12 and rudder 14 and with lower and upper wings 16 and 18, respectively. Landing gear 20 is provided on the body and the airplane is propelled by propeller 22 rotatably mounted at the forward end or nose 24 of the craft.

The airplane is preferably of very light construction intended to be aerodynamically self-supporting at relatively low air speeds. Accordingly, durable but lightweight materials are used in constructing the aircraft with the body 10 and rudder 14 being integrally formed of hollow molded plastic. The wings 16 and 18 and stabilizers 12 of the tail assembly are preferably of balsa wood laminated between surface layers of paper.

Heretofore it has not been possible to provide a remotely powered and controlled aircraft of biplane construction at reasonable expense because of the problem of providing a durable lightweight support structure for the upper wing. Support means for the upper wing are required which are, of course, lightweight, sufficiently rigid to support the wing and also sufficiently resilient to withstand the shocks such a toy is subjected to.

According to one aspect of the present invention, means are provided for supporting an upper wing from the lower wing and the body, which support means meet the requirements set forth above and make possible the manufacture of a lightweight durable aircraft of biplane design at relatively low cost.

Such novel support construction is accomplished by providing a plurality of eyelets, or openings, in either or both of the upper and lower wings and a plurality of support struts with wing engaging means on at least one end thereof for engaging the wing through the eyelets. The struts are sufficiently flexible to permit limited movement of the wing engaging means relative to each other, whereby the wing engaging means may be selectively inserted through the eyelets and into engagement with the wing. Preferably, the eyelets, struts and wing engaging means are so spaced and configured that with the wing engaging means inserted through the eyelets, and engaged with the wings, the struts will remain partially flexed so as to exert a retaining force between the wings and the wing engaging means.

The desired construction is provided in the disclosed and preferred embodiment. The lower wings 16 are formed of a single member inserted through a slot provided in the hollow aircraft body 10 and suitably bonded in place. The upper wing 18 is also formed of a single piece and is adapted to be supported above the lower wings and body. A pair of longitudinally spaced and transversely aligned openings or eyelets 26 are provided on each side of lower wing 16 outboard of the body 10. A pair of corresponding eyelets 28 is provided on each side of upper wing 18. A third pair of eyelets 30 is provided in the upper wing aligned with the longitudinal axis of the aircraft body. In the preferred construction, the wings 16 and 18 include metal reinforcing rings 26a, 28a and 30a which line, and form the margins of, the respective eyelets 26, 28 and 30. The wings are thus reinforced at the margins of the eyelets, or openings, to provide a more durable construction. However, the reinforcing rings are not essential and may be eliminated where a suitably durable structure can be otherwise provided; as, for example, by forming the wings of an alternate material, such as plastic, which is less subject to abrasion than is the preferred balsa wood.

Figure 3:
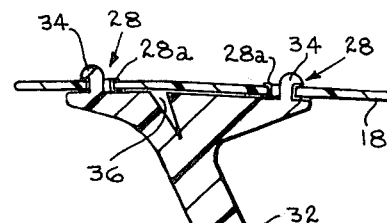
FIG. 3 is a vertical section taken along line 3—3 of FIG. 1 illustrating details of the wing struts.

As shown most clearly in FIG. 3, a pair of wing struts 32 is provided having wing engaging means thereon for engaging the upper wing at the margins of eyelet pairs 28 and for engaging the lower wing at the margins of eyelet pairs 26. As disclosed, the eyelet engaging means comprise a pair of hooks 34 provided on each end of each strut 32. The two hooks of each pair face in opposite directions and the size of hooks 34 is preferably such as to just permit their insertion through the eyelets with limited clearance. The vertical dimension of the hook openings is only slightly greater than the wing thickness so as to provide a secure engagement with the wings.

The struts 32 are generally flat with both the struts and hooks 34 being integrally formed of molded plastic. A generally vertically disposed slot 36 is provided in each end of the struts intermediate the hooks 34 to provide flexibility of the struts, permitting limited movement of the hooks 34 relative to each other.

Figure 2:
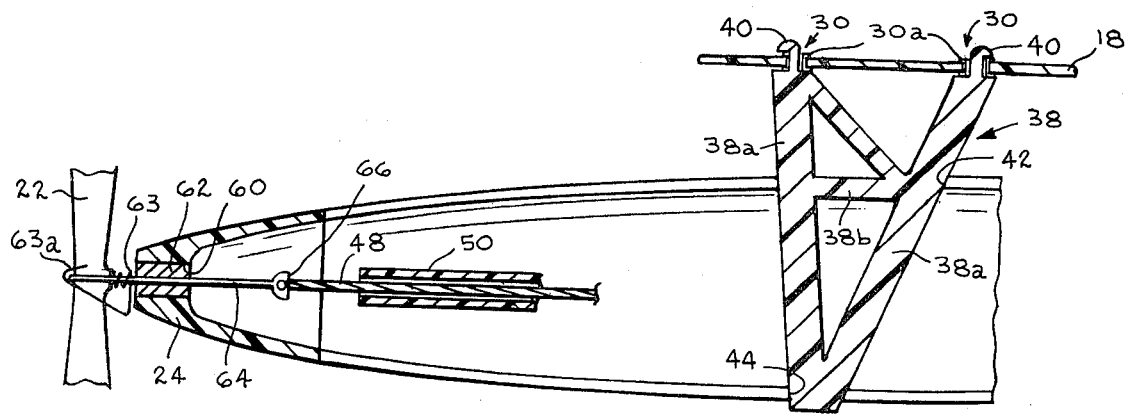
FIG. 2 is a view in vertical section taken along line 2—2 of FIG. 1 and illustrating details of the propeller and drive mechanism and of the body strut for supporting the upper wing.
Figure 4:
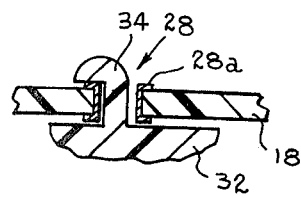
FIG. 4 is an enlarged detail view in sectional elevation of the wing engaging hook on a wing strut inserted through an eyelet in the wing.

A body strut 38, with a pair of hooks 40 on the upper end thereof, is provided for engaging the upper wing 18 through the central pair of eyelets 30. As shown in FIG. 2, the body strut 38 is roughly V-shaped, having two upwardly diverging legs 38a cross-braced by brace members 38b. One hook 40 is provided on the upper end of each leg 38a. As with the wing struts 32, the body strut 38 with hooks 40 is generally flat and preferably integrally formed of molded plastic.

The two-leg design of the body strut renders it flexible, thus permitting limited movement of hooks 40 relative to each other.

In assembling the bi-wing structure, the lower wing is inserted through the slot provided in body 10 and suitably bonded in place. The body strut 38 is inserted into upper and lower slots 42 and 44, respectively, formed in the body 10 and is then also bonded in place. One suitable form of bonding which has been found is the application of a plastic solvent to the portions of the body strut which engage the body 10. The solvent acts to dissolve a limited amount of the plastic of both the strut and the body and, upon evaporation of the solvent and resetting of the plastic, the two are firmly welded together.

With the lower wing 16 and body strut 38 in place, the upper wing may be attached by compressing or flexing the body strut 38 so as to move the two legs 38a with hooks 40 toward each other sufficiently to permit the insertion of hooks 40 through eyelets 30 for engagement with the upper wing at the margins of the eyelets as shown in FIG. 2. The configuration and size of the hooks and eyelets prevent disengagement of the hooks, once engaged, until the strut 38 is again compressed to move the hooks toward each other. However, it is preferred that the eyelets, hooks and strut be so spaced and configured that the hooks, once inserted through the eyelets and engaged with the wings at the eyelet margins, will not move apart sufficiently to permit full relaxation of the compression introduced into strut 38. Strut 38 will then remain partially flexed or compressed so as to exert a retaining force between the hooks and the wings. This retaining force provides both rigidity and resiliency to the construction.

The hooks 34 on each end of the wing struts 32 are engaged with the lower and upper wings by insertion through the eyelet pairs 26 and 28 in similar manner. The wing struts 32 also preferably remain partially flexed with hooks 34 engaged with the wings, to thereby exert a retaining force between the wings and the hooks. While the hooks on each of the struts are disclosed as facing outward, so that the retaining force is generated by compression in the struts, it is apparent that the hooks could as well face toward each other so that the hooks would be engaged by stretching (rather than compressing) the struts and the retaining force would then be generated by tension in the struts.

In order to provide a very light model aircraft which can be aerodynamically self-supporting at relatively low air speeds, the driving mechanism for the propeller 16 is located remotely from the aircraft itself. The driving mechanism comprises a remote drive unit, indicated generally at 46, which is connected to the propeller 22 by means of an elongated flexible drive cable or wire 48 enclosed in a flexible tube or housing 50.

The remote drive unit 46 includes a hollow housing 52 which contains an electric motor (not shown) for driving the cable 48 and a battery supply (not shown) for powering the electric motor. The housing 52 serves as a handle for the operation to hold the drive unit and a switch 54 controls operation of the electric motor. Details of the construction of the remote drive unit, including the motor and battery power pack, are disclosed more fully in U.S. Pat. No. 3,018,585.

A flexible coil spring 56 extends axially from the forward end of the drive unit housing in surrounding relationship to the tube 50 to provide flexible support means for the drive cable 48 and tube 50. The flexible support provided by coil spring 56 prevents sharp bends in the tube or cable as they enter the housing 52. The drive cable 48 extends through coil spring 56 and into the drive unit where it is suitably engaged with the electric motor. The flexible tube 50 extends at least into the outer end portion of spring 56 and is rotatable with respect to the spring 56 and drive unit 46. The flexible tube 50 is nonrotatably connected to one of the aircraft wings, preferably upper wing 18 as by tape 57 for the purpose of rendering the aircraft more controllable in flight as discussed more fully in U.S. Pat. No. 3,081,585. The tube 50 and cable 48 enter the aircraft body through a port 58 provided in the body behind the nose section 24.

As shown most clearly in FIG. 2, the nose 24 of the aircraft is formed with an end opening 60 within which a tubular plug or bushing 62 is fitted. The propeller 22, which is preferably of molded plastic construction, has a short metal or wire shaft 64 which extends through the bushing 62 and to which the drive cable 48 is attached as indicated at 66. A light coil spring 68 is wound about the propeller shaft 64 intermediate the forward end of bushing 62 and the propeller 22 and has one end 68a looped around the forward end of the propeller. The spring 68 serves to space the propeller from the bushing and to retain the propeller on its shaft 64.

In operation of the model aircraft, the remote drive unit 46 is held in the operator's hand and switch 54 is depressed to actuate the electric motor which rotates the cable 28 to drive the propeller 22. The aircraft will then fly in a circular pattern having a radius equal to the length of cable 48 and tube 50. With each rotation of the aircraft relative to the drive unit, the tube 50, which is nonrotatably affixed to the aircraft wing, will rotate 360° with respect to the drive unit 46.

The length of the drive cable and tube are preferably such as to provide a substantial radius of flight for the airplane so that the toy may be enjoyably used out-of-doors. However, it will be apparent that this same radius of flight might not be practical for indoor use because of the restricted flight area available due to walls, furniture, etc. Therefore, according to an important feature of the invention, there is provided means for foreshortening the effective length of the drive cable and tube to thereby reduce the radius of flight of the aircraft while at the same time not interfering with operation of the drive cable and tube 50. These means preferably comprise a secondary control knob 70 slidably and rotatably mounted about the tube 50. The secondary control knob is formed of some lightweight durable material such as wood or plastic and has a central bore 72 extending therethrough. An elongated flexible coil spring 74 is mounted in the bore 72 and has a portion 74a extending outwardly from the forward end of the secondary control knob and a somewhat shorter portion 74b extending rearwardly from the rear end of the secondary control knob. The tube 50 and drive cable 48 extend through the center of coil spring 74 which thereby provides a flexible support at the forward end of the control knob to avoid sharp bending of the cable 48 and tube 50. The spring 74 is preferably configured so that the inner diameter of at least the rear portion 74b is approximately equal to the outer diameter of the end portion of coil spring 56 on the remote drive unit. This permits the spring 74 of the control knob to be threaded onto the spring 56 of the drive unit to provide means for releasably attaching the control knob to the drive unit when the secondary control knob is not in use.

Figure 5:
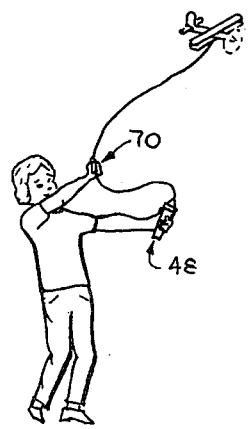
FIG. 5 is a perspective view illustrating the aircraft of the present invention in flight and showing how the secondary control knob may be used to control the radius of flight.

When it is desired to use the secondary control knob to shorten the radius of flight of the aircraft, it is detached from the drive unit and held in one hand by the aircraft operator while the remote drive unit is held in the other as illustrated in FIG. 5. The secondary control knob may be placed at any desired point along the drive cable and the tube, and the radius of flight will be determined by the length of drive cable and tube remaining between the secondary control knob and the aircraft. The aircraft may also be made to respond to rapid movements of the control knob or flexations of control knob spring 74 to adjust the aircraft's flight characteristics, perform stunts, etc.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In a model aircraft of the type wherein a propeller is driven from a remote drive unit by an elongated flexible cable confined within a flexible tube, the improvement comprising:
    a secondary control knob slidably and rotatably mounted about said tube which may be selectively positioned to control the effective length of said drive cable and tube to thereby selectively control the radius of flight of said aircraft,
    said secondary control knob including a flexible support at the forward end thereof to prevent sharp bends in said flexible cable and tube.

2. In a model aircraft of the type wherein a propeller is driven from a remote drive unit by an elongated flexible cable confined within a flexible tube, the improvement comprising:
    a secondary control knob slidably and rotatably mounted about said tube which may be selectively positioned to control the effective length of said drive cable and tube to thereby selectively control the radius of flight of said aircraft,
    said secondary control knob including means for releasable attachment to said remote drive unit.

3. The apparatus of claim 1 wherein said remote drive unit includes a coil spring disposed about said flexible tube and wherein said secondary control knob has a central bore therethrough and said flexible support comprises an elongated coil spring disposed in the bore of said control knob and extending outwardly from at least the forward end thereof and wherein the rear portion of said spring on said secondary control knob is adapted to threadedly engage said spring on said remote drive unit.

4. The model aircraft according to claim 1 wherein said aircraft is of biplane construction and wherein each of said upper and lower wings define a plurality of eyelets and including additionally means for supporting the upper wing of said aircraft comprising:
    a plurality of support struts having wing engaging means on each end thereof,
    said struts being flexible so as to permit limited movement of said wing engaging means relative to each other whereby said wing engaging means may be selectively inserted through said eyelets and into engagement with said wings at the margins of said eyelets.

5. A model aircraft comprising:
    a body;
    lower wings supported by said body and defining a plurality of eyelets;
    an upper wing defining a plurality of eyelets;
    means for supporting said upper wing from said lower wings and said body comprising,
    a pair of wing struts extending between said upper and lower wings and having a pair of wing engaging means on each end thereof, and
    a central body strut having its lower end mounted on said body and having a pair of wing engaging means on the upper end thereof,
    each of said struts being flexible so as to permit limited movement of said wing engaging means on said struts relative to each other whereby said wing engaging means may be selectively inserted through said eyelets into a position in engagement with said wings;
    a propeller;
    a remote drive unit for driving said propeller;
    an elongated flexible drive cable extending between said remote drive unit and said propeller for rotatably driving said propeller from said drive unit;
    an elongated flexible tube extending between said body and said remote drive unit in surrounding relationship to said drive cable; and
    a secondary control knob slidably and rotatably mounted about said tube for selectively foreshortening the effective length of said tube and said cable to thereby control the radius of flight of said aircraft,
    said secondary control knob including a flexible support at the forward end thereof to prevent sharp bends in said flexible cable and tube.

* * * * *